United States Patent

[11] 3,608,914

| [72] | Inventor | Eigil Brandt Harby<br>Strandvejen 39, Klampenborg, Denmark |
|---|---|---|
| [21] | Appl. No. | 736,609 |
| [22] | Filed | June 13, 1968 |
| [45] | Patented | Sept. 28, 1971 |

[54] GASKET, PARTICULARLY FOR CYLINDER HEADS, COMPRISING GASKET AREAS OF GRADUATED RESILIENCY
4 Claims, 4 Drawing Figs.

[52] U.S. Cl. .................................................. 277/235 B
[51] Int. Cl. ..................................................... F16j 15/00, F16k 41/00
[50] Field of Search ........................................... 277/235 B, 180, 166

[56] References Cited
UNITED STATES PATENTS

| 2,092,231 | 9/1937 | Victor | 277/235 |
|---|---|---|---|
| 2,729,483 | 1/1956 | Victor | 277/166 |
| 2,197,916 | 4/1940 | Balfe | 277/233 X |

FOREIGN PATENTS

| 230,680 | 12/1963 | Austria | 277/235 |

OTHER REFERENCES

Auslegeschrift 1219 302 June 1966 2 pges. Spec; 1 sheet Drug

*Primary Examiner*—Samuel B. Rothberg
*Attorney*—Howard G. Russell

ABSTRACT: A sealing gasket is disclosed comprising essentially a layer of elastic sealing material and a layer of reinforcing material, e.g., a metal sheet, this sheet being perforated with a great number of small holes located in relation to each other with a varying density in such a manner that said density is lowest in the areas where, in use of the gasket an increase in the specific pressure is desirable or necessary, the edge of gasket apertures registering with apertures corresponding for instance to cylinder being folded back, if desired, in order to provide locally an extra thickness producing an increased specific pressure, the perforations being advantageously produced by means of a tool comprising punches optionally rendered active or inactive by means of a patterned platen provided serving to operate the punches in the manner of a Jacquard loom, the entire perforation being carried out in one or several operations.

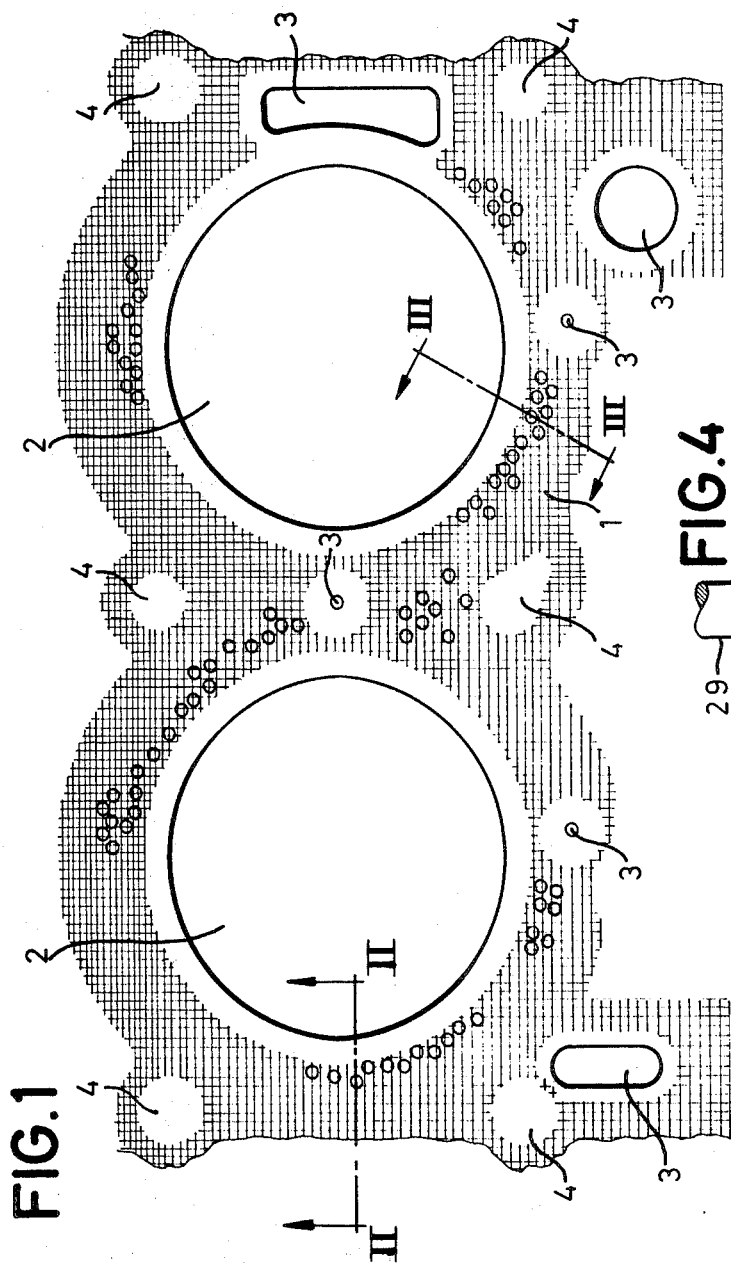

GASKET, PARTICULARLY FOR CYLINDER HEADS, COMPRISING GASKET AREAS OF GRADUATED RESILIENCY

This invention relates to gaskets, such as are used to form a seal between plane surfaces of a more or less complex configuration of two machine or duct parts clamped together.

In order to obtain a reliable seal, it is necessary that the specific surface pressure created by the clamping force has at all points the value required for withstanding the pressures occurring during operation, and since these pressures, for example in high-pressure pipelines and in internal combustion engines, may assume considerable values, and since a certain degree of flexibility of the clamped parts together with possible difficulties in most advantageously placing the clamping bolts makes it impossible to ensure an even distribution of the surface pressure over the entire gasket area, a reliable seal may in many cases only be obtained by applying such high clamping forces that serious difficulties in structural and operational respects are created.

Usually, the gaskets here concerned consist of a combination of a resilient material having sealing properties and another material which mainly serves to support and reinforce the gasket material proper, for example in the shape of the well-known copper-asbestos gaskets consisting of an asbestos sheet sandwiched between two thin copper sheets. With the increasing working pressures and temperatures, occurring for example in modern internal combustion engines, there is an increasing tendency to use the thinnest possible gasket material, for example between the cylinder block and the cylinder head, but in so doing the absolute resiliency will become extremely small, and the risk of the specific surface pressure becoming too low at critical places is considerably increased. Consequently, in such gaskets it is known to locally increase the thickness of the gasket by applying local reinforcements at the critical places with local reinforcements at the critical places which, however, results in a very substantial increase in the manufacturing price of the gaskets, in that it is necessary to make complex and expensive punch and press tools for each individual type of gasket. The technical result of such gaskets provided with applied thickenings is, moreover, not always satisfactory.

The invention relates to a gasket in which these disadvantages have been overcome, and which admits of being producing in a simple and relatively cheap way in many different embodiments corresponding to the shape of the sealing surfaces.

The gasket according to the invention is of the type comprising bonded, for example glued together, layers of resilient sealing material and substantially noncompressible reinforced material, especially metal sheet, and the characteristic of the invention consists in that at least one layer of reinforcing material is over the entire, or greater part of, the gasket area perforated with small holes arranged with a mutual density that varies in such a way that the density is less in areas where an increase of the specific surface pressure in the operational condition is desired or necessary. In this manner it is possible by varying the degree of perforation density, to compensate for the undesired irregularities in the specific surface pressure in the clamped together condition and to provide for any desired distribution of the surface pressure, for example, to produce high pressures at such areas of the gasket where a seal absolutely must be ensured, and lower surface pressures at the areas which are less critical in sealing respects. This graduation is attained through the feature, that on tightening of the assembly the resilient gasket material is capable of yielding into the numerous small holes constituting the perforation, so that the entire gasket will, consequently, display a graduated resiliency dependent on the density of the perforation, so that areas where the perforation is not so dense or entirely left out will display a minimum of resiliency, whereas areas with a denser perforation will display a correspondingly greater resiliency.

Even with sealing surfaces of a very complex configuration, it is relatively simple by calculation or experiment to find out how the specific surface pressure will vary when using a gasket with uniform resiliency over the entire gasket area, and on the basis thereof make the necessary corrections in determining the pattern of perforation.

Thus, according to the invention the gasket may be provided with perforations, the density of which is increased beyond the average density in areas where a reduction of the specific surface pressure is desirable or permissible so that the necessary total clamping force may be reduced without the risk of a failing seal.

According to the invention the perforation may be entirely left out in narrow areas around an aperture in the gasket which in operation registers with spaces in which the highest working pressures occur, whereby it is attained that a narrow area of high specific surface pressure is created in a simple way directly around the places where the high working pressures occur; and consequently sealing is ensured so that the working pressure is prevented from penetrating between the clamped-together surfaces and the gasket. The sealing safety can be further increased by letting the nonperforated portion of the reinforcing material layer extend by a small margin into the opening concerned where it is bent over or rolled over to form a thickened edge surrounding the aperture and, consequently, produces a local increase in the specific surface pressure. In bending-over said margin there is also provided added protection for the exposed edge of the resilient gasket material in a similar manner as in previous gaskets where protection was provided by means of separate inserted rings.

As materials in the gasket such resilient sealing materials may be used as contain asbestos or glass fiber and other organic or inorganic fibers, natural and synthetic rubber, silicones, Teflon and other elastomers together with organic or inorganic fillers, whereas the reinforcing material to be used may be thin sheets of iron, copper, brass, aluminum, zinc and lead or possibly suitable plastics having the required strength. The individual layers of material may be bonded with suitable binders or, if convenient, only pressed together under the application of heat, if the materials themselves have adhesive properties. Normally and advantageously, the gasket comprises a central reinforcing layer and a layer of resilient sealing material on either side of the layer, but there should be nothing to prevent the gasket from being composed of only one reinforcing layer and one sealing layer only or, if desired, of a greater number of individual layers in a desired sequence.

Also, the invention relates to a method for the manufacture of the gaskets concerned, with which method is characteristic in that a sheet of the material serving as reinforcing material is provided with perforations in a pattern of varying density corresponding to the desired graduation of the resiliency of the finished gasket over the gasket area. When a sheet of reinforcing material so prepared is united with one or more sheets of sealing material, a gasket is produced in a simple manner having the properties characteristic of the invention.

However, it is also possible to provide perforations in two successive, or all, of the layers of material of which the gasket is composed.

In an advantageous embodiment of the method according to the invention, the perforation may be produced by means of a punch tool having a large number of parallel-working pin punches arranged in the desired basic pattern and controlled individually into operative or inoperative condition during each working stroke of the tool in conformity with the desired distribution of perforations over the relevant area of the sheet. Hereby is attained that for the production of gaskets of many different configurations, it is possible to use a single punch tool, the pins of which are made operative or inoperative during successive working strokes to produce a perforation pattern having the desired graduation of the density. Since, normally, a rather fine perforation should be used, it may be advantageous to provide the tool for punching with only one-half or one-third of the required punches of the basic pattern, and displace the gasket suitably between successive strokes so that the total basic pattern is produced by a series of successive strokes. The graduation in the density of the perforation pattern is then provided according to the invention by selected pin punches being maintained inoperative during one or more or all of the successive working strokes.

The invention also comprises a particularly advantageous embodiment of a punch tool for performing the method, said tool consisting of a large number of parallel-working pin punches mounted in a common retainer, and a presser member common to, and serving for actuating, said pin punches, the characteristic of the tool according to the invention being that a power transmission member is provided between said presser member and said pins in the form of an exchangeable plate having recesses registering with the pins to be inoperative during the punching operation concerned. Hereby is attained that one and the same tool may in a simple way be used for punching widely differing patterns by inserting plates with varying configurations of recesses which plates will thus operate similarly as the punched cards in a Jacquard mechanism. Gaskets of any size and form and with optionally varying perforation pattern can thus be produced with one and the same tool, since only said plates have to be adapted to the particular gasket configuration, which is by far cheaper and quicker than having to produce complete punch tools as such for each individual gasket type or model.

The invention is illustrated in the accompanying drawing in which

FIG. 1 diagrammatically shows a portion of a metal sheet forming part of a gasket according to the invention, FIG. 2 and 3 two different embodiments of a bent over edge, and FIG. 4 diagrammatically shows the most important parts of a punching tool according to the invention.

In the drawing, 1 designates quite schematically a metal sheet which serves as reinforcing element of a gasket comprising, further, layers 101 (FIGS. 1 and 2) of resilient sealing material bonded to the sheet 1, which gasket is here assumed to be a cylinder head gasket for a multicylinder internal combustion engine, the sheet configuration in other respects matching the configuration of the cylinder block and the cylinder head at their juxtaposed surfaces. The apertures in the packing for the engine cylinders are designated by 2, whilst 3 designates openings for coolant ducts and other ducts around which a seal is to be provided, and 4 designates passage openings for clamping bolts and other openings around which a seal is not necessary.

In the sheet shown in the drawing there is drawn a dense square mesh line pattern which is assumed to form the basic pattern of a perforation pattern carried out with small through-holes in the points of intersection in the mesh. The perforation pattern is only shown fragmentary but it appears from the mesh pattern that it extends over the entire sealing area of the gasket except narrow areas around the openings 2 and 3 around which an absolute seal is to be provided. When the illustrated metal sheet is united with one or two sheets of suitable sealing material stamped out with the same contour, a gasket is produced which on being clamped between the upper face of a cylinder block and the lower face of the cylinder head will display substantially greater resiliency in the areas provided with perforation than in the nonperforated areas so that the specific surface pressure will be greatest in the areas which in FIG. 1 are shown without any mesh pattern (perforation) so that at the openings surrounded by said areas an absolute seal is provided with a comparatively limited total clamping force.

The specific surface pressure over the perforated areas can be varied by varying the density of the perforation, for example by leaving out, within areas where a comparatively high, but not maximum, value of the surface pressure is desirable, some of the perforation holes, for example every third or second hole. Incidentally, the perforation may in areas where only a slight surface pressure is necessary or desirable, be even denser than shown.

In the embodiment shown it is assumed that the perforation is in the form of circular holes. However, there should be nothing to prevent holes of another cross-sectional shape from being used, such as triangular or square holes. Hexagonal holes could with particular advantage be used in a honeycomb pattern, whereby it is possible to obtain a very high degree of perforation while maintaining, at the same time, a considerable strength in the sheet.

The edge of special margin areas of high specific surface pressure may be designed as shown in FIG. 2 or 3 where the nonperforated area of the sheet originally extends some distance into the opening and is bent over—preferably together with the reinforcing plate being united with the sealing material—whereby an edge is produced which further reduces the compressibility of the gasket at the margin area concerned, and which moreover to a greater or smaller degree protects the free edge of the sealing material.

The perforation of the reinforcing plate can for example be carried out with a tool like the one outlined in FIG. 4. The tool consists of a die plate 20 having a number of die holes 21 arranged in a basic perforation pattern, or in a pattern which by successive punchings with intervening minor displacements of the sheet results in the desired basic pattern of perforation. The plate to be punched is designated by 30 and is here to assumed to be introduced on top of the plate below a retainer plate 23 which supports and guides a number of pin punches 24 each corresponding to one of the die openings 21. Each of the pin punches surrounded by a spring 25 clamped between the retainer plate 23 and a head on the pin punch and, consequently, maintaining said pin in a raised position. The punching stroke is carried out by means of a presser member 28 vertically reciprocated as shown by a double arrow 28, by means of a stem 29 which in a manner, not shown, is secured in a tool holder in a punch press. The punching pressure is transmitted from the presser member 28 to the pins 24 through a plate 27 in which there are provided recesses 26 opposite the pins that are not intended to be operative during the relevant punching operation. It will be seen that by producing the recesses 26 in different patterns and on different extension, it is possible to control fully the pattern punched out during each punching stroke, and to produce any desired total configuration by replacing the plate 27 with plates having the recesses otherwise arranged.

The tool may be so large as to cover the entire gasket sheet desired, but it may also be smaller so that only a limited area thereof is worked at a time, and the desired total pattern is produced by a series of successive punchings with intervening displacements of the sheet in relation to the tool. In any case it is thus possible to provide, by means of differing pressure-transmitting plates 27, any desired perforation pattern of any desired varied density from area to area.

What is claimed is:

1. A gasket comprising at least two bonded layers of resilient sealing material, and substantially noncompressible reinforcing material, respectively, at least one layer of noncompressible reinforcing material having stock blanked out therefrom to produce a multitude of tiny holes into which holes the overlying resilient sealing material is partially forcible by the clamping pressure to which the gasket is subjected, the density of said holes per unit of area of the overlying sealing material being nonuniform in the sense that the density is relatively low in one area where a relatively high specific sealing pressure is to be produced, and higher in another area where a relatively low specific sealing pressure is to be produced.

2. A gasket as defined in claim 1 in which the gasket comprises a passage therethrough and in which said passage is bordered by a continuous relatively narrow zone within which the hole density is substantially lower than in the area beyond said zone.

3. A gasket as defined in claim 1, in which the gasket comprises a passage therethrough and in which said passage is bordered by a continuous relatively narrow zone free from said holes.

4. A gasket as claimed in claim 1, in which the variation of the pattern density is selected so as to compensate for flexure of the machine parts between which the gasket lies compressed in operation so as to create a desired sealing pressure distribution over the confronting surfaces of said machine parts.